July 31, 1956 — R. J. BONDLEY — 2,756,588
APPARATUS FOR DETERMINING STRESS
Filed Sept. 29, 1951
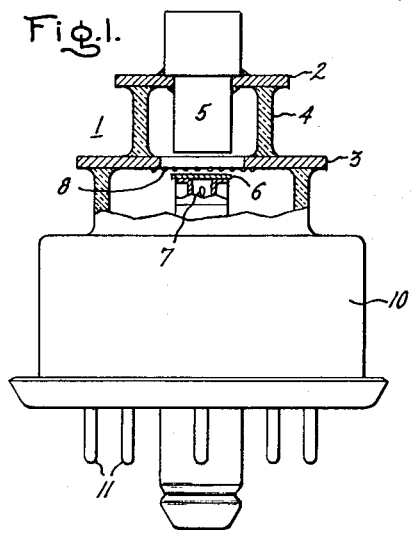
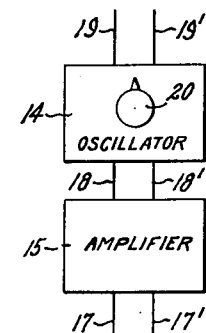
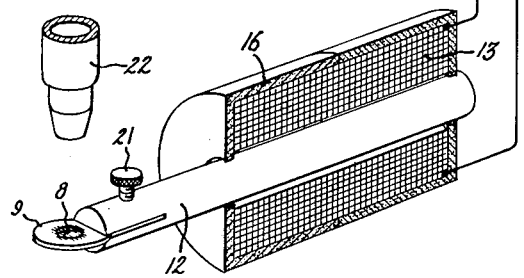
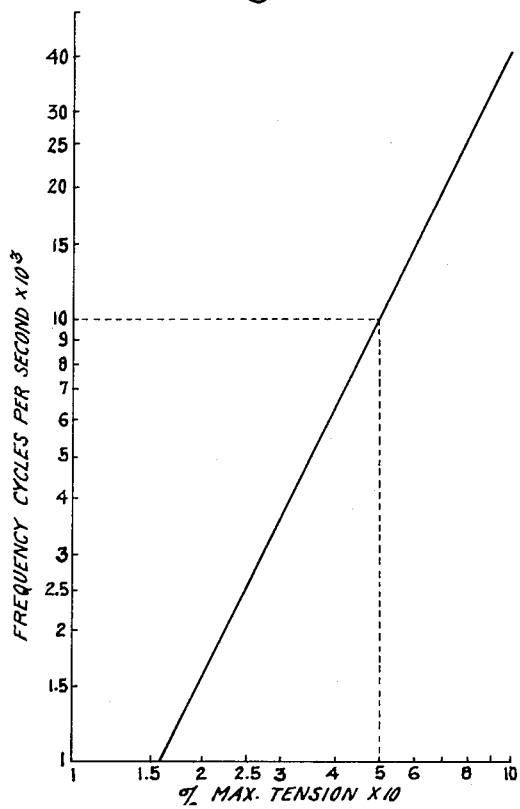
Inventor:
Ralph J. Bondley,
by Paul A. Frank
His Attorney.

United States Patent Office 2,756,588
Patented July 31, 1956

2,756,588
APPARATUS FOR DETERMINING STRESS

Ralph J. Bondley, Scotia, N. Y., assignor to General Electric Company, a corporation of New York Application September 29, 1951, Serial No. 248,945

2 Claims. (Cl. 73—67)

The present invention comprises an apparatus whereby the operating characteristics of minute filaments which are mounted under tension in harp-like relation on a frame may be determined by a nondestructive test prior to the assembly of such structure in combination with other members of a complete device.

The invention is of particular interest and value for testing planar grids of microwave electronic tubes constructed for operation at high frequencies. As described by E. D. McArthur in Electronics, vol. 18, part 1 (February 1945), pages 98 to 102, the essential elements of microwave tubes are constructed to lie in substantially parallel planes and the clearance between the grid and the cathode of such device is as close as a small fraction of a mil. The grids of such tubes comprise a plurality of tiny equally spaced filaments mounted upon a holder or frame which forms part of a disk seal of the tube structure. These filaments are so attenuated in diameter as to be scarcely discernable by the unaided human eye. Such minute wires, which are attached closely adjacent and under tension to the grid frame, must maintain their necessary geometric relation to one another and to other members of the structure when subjected to heating during the operation of the device. Departures from predetermined tension and defects in other characteristics of one or more of said filaments, for example, insecurity of attachment, will result in faulty or inefficient operation of the electronic device and may even result in its complete failure.

In accordance with the present invention the mechanical condition of such planar grid devices may be determined by a nondestructive test which comprises subjection of the grid device to forced longitudinal mechanical vibration substantially normal to the lenth of the harp-like filaments and varying the frequency of the vibrations over a predetermined range in which similar filaments of known normal properties will be set into transverse vibration and observing the response to said vibrations of each of the filaments being tested. For the observation of the grid filaments during such test the vision of the observer should be appropriately aided as by adequate magnification of the filaments through a suitable microscope.

The accompanying drawing shows in Fig. 1 a front elevation of a disk-seal type of electronic tube, represented as being in part broken away to illustrate the relation of cathode and grid; Fig. 2 is a somewhat diagrammatic representation of a vibration device and related parts and having a planar grid mounted thereon in position to be tested, and Fig. 3 is a graph showing the relation of the tension of the grid wires and their frequency of resonant transverse vibration.

Referring to Fig. 1, the disk-seal type electron tube which is illustrated is not shown in complete detail. The envelope 1, which includes disks 2 and 3 sealed to an intermediate member 4 of glass, is broken away to show the anode 5 and the cathode 6, the latter being maintained at electron-emitting temperature by a heater 7. The grid 8 is located in the electron tube between the anode and cathode. It is constituted of a number of minute parallel wires and is spaced very closely adjacent the cathode 6. These grid wires 8 are mounted on a frame 9, shown in Fig. 2, being mounted across an opening of the frame 9 often as many as 2000 wires to the inch. They extend parallel to one another in closely juxtaposed relation. The other members of the electron tube, such for example, as the main envelope wall 10 and the contacts 11 have been merely indicated to complete the illustration.

The grid wires are so fine as to be practically invisible, ordinarily having diameters in the range of 0.00015 to 0.0003". They are stretched taut across the opening in the frame and are accurately and uniformly spaced by the operation of a mechanical device not here illustrated. The grid wires are united with the frame by fusion of a brazing metal (not shown), such as copper or gold, which for convenience is applied to the surface of attachment before the grid wires are mounted on the frame.

Electronic tubes constructed for operation at very high frequencies require close spacing of elements and a parallel plane geometry of construction. The grid wires are located even more closely to the cathode than can be represented in a drawing. The spacing between the grid wires and the most adjacent surface of the cathode may be as small as 10 to 20 microns. During operation the grid wires become heated by direct radiation from the cathode and by electric energy dissipated directly in the grid. Heating of the wires causes dimensional changes. In a grid, constructed as illustrated and explained, an increase in length will cause the grid wires to bow which will change the geometry and hence change the characteristics of the electron tube. Excessive bowing may even cause disastrous contact between the grid and the cathode. For this reason the grid wires are mounted under tension, as previously stated, resulting in preservation of desired geometry for changes of length normal during the operation of the tube.

Assuming the grid wires to consist of tungsten and the frame to remain at a sufficiently low temperature compared to the temperature of the wires to permit neglect of dimensional changes of the frame and assuming the grid wires to be at a uniform temperature throughout their length the following calculations can be made.

The mean thermal coefficient of expansion of tungsten is $4.6 \times 10^{-6}$ units per unit per degree centigrade. Thus the increase in length S of a wire is equal to $$S = L \times T \times 4.6 \times 10^{-6} \qquad \text{Eq. 1}$$

$L$ = length, and $T$ = temperature rise.

The modulus of elasticity =

$$M = \frac{FL}{as}$$

where in C. G. S. system $F$ = force in dynes
$L$ = length of specimen in centimeters
$a = \pi r^2$ = cross sectional area in cm.$^2$
$S$ = elongation Solving for elongation, $$S = \frac{FL}{aM} \qquad \text{Eq. 2}$$

As the elongation due to thermal expansion must not be greater than the elastic elongation resulting from stressing the wires, the limiting temperature is reached when the two are equal. Mathematically the relationship may be expressed as follows:

$$L \times T \times 4.6 \times 10^{-6} = \frac{FL}{aM}$$

The modulus M for tungsten is $35.5 \times 10^{11}$, so that $$T = \frac{F}{\frac{\pi d^2}{4} \times 4.6 \times 35.5 \times 10^5} = \frac{7.8 \times 10^{-8} \times F}{d^2} \quad \text{Eq. 3}$$

If the diameter is measured in mils, as is the usual convention, $$T = \frac{F \times 1.2 \times 10^{-2}}{d^2} \quad \text{Eq. 4}$$

Where

T is the maximum temperature in degrees centigrade
F is the tension in dynes
d is the diameter in mils For very fine wires, i. e., wires of .001 inch diameter and smaller, the modulus of rupture is nearly proportional to the square of the diameter, hence $$\frac{F}{d^2}$$

can be expressed as a numerical quantity. By experiment this number is approximately 120,000 at the breaking point and T, the maximum permissible temperature, becomes 1400° C. As seen in Equation 4, the temperature is directly proportional to the stretching force. Thus, if the wires are stretched to half their ultimate breaking tension, they can be operated up to a temperature of 700° C. before the stresses are relieved.

The formula for the fundamental period of transverse vibration $f$ of a wire is as follows:

$$f = \frac{1}{2L} \sqrt{\frac{P}{m}} \quad \text{Eq. 5}$$

In C. G. S. units P is in dynes $m$ = grams per cm. length
$L$ = length in cm.

Solving for P the result is:

$$P = 4mL^2 f^2 \quad \text{Eq. 6}$$

This P is the same as the F of Equation 4, so by substituting this value for F, the following expression can be obtained to give the maximum operable temperature of the grid in terms of the frequency of transverse vibration of the stretched wires:

$$T = \frac{4mL^2 f^2 1.2 \times 10^{-2}}{d^2}$$

Since it is customary in industry to express the wire size as weight in milligrams per 200 mm. length, $$T = 4.7 \times L^2 f^2 \times 10^{-6} \quad \text{Eq. 7}$$

Where

T is maximum permissible operating temperature
L is span in centimeters
$f$ is frequency of vibration of lowest mode.

It is interesting to note that if the modulus of elasticity is a constant for wires of small diameter, $$\frac{P}{m}$$

is a constant numerical quantity independent of the wire diameter. Equation 5 shows that the period is the same for all diameter wires of a given span provided they are stressed to the same degree per incremental area. If the $$\frac{P}{m}$$

ratio is taken in per cent of its maximum value, a figure of merit for the completed grid can be established. For example, if the measured period of the wire is one-half that of the theoretical maximum, then the actual tension is only one quarter of the theoretical maximum, because the transverse frequency varies as the square root of the ratio of $$\frac{P}{m}$$

In Fig. 3 the frequency of vibration as found from Equation 5 is plotted against the percentage of ultimate allowable tension for a grid span of .171 inch.

In Fig. 2 of the drawing, a means is illustrated for subjecting the grid frame and thus also the grid wires, to externally applied longitudinal mechanical oscillations at right angles to the length of the grid wires. This means consists of an electromechanical transducer whereby electric oscillations are converted by magnetostriction into longitudinal mechanical oscillations. Referring to the drawing, a nickel tube or rod 12 is subjected to a variable magnetic field generated by a surrounding winding 13 which is energized by an electric oscillator 14, the oscillations being amplified by an amplifier 15. A powdered iron core 16 intensifies the magnetic field. The conductors 17, 17' connect the winding 13 to the amplifier, the conductors 18, 18' connect the oscillator output terminals to the input terminals of the amplifier. The source of energy is represented by the conductors 19, 19'. The frequency of longitudinal oscillations may be varied by a conventional manually operable regulator, the handle of which is shown at 20.

Assuming a grid frame 9 to be firmly clamped by a set screw 21 to the slotted movable end of the nickel member 12 (the opposite end being fixedly anchored) a magnetizing force of about 200 oersteds will cause the nickel member to change length by about $3 \times 10^{-5}$ inches by magnetostriction. This longitudinal vibratory motion repeated at proper frequency at right angles to the length of the grid wires will excite to resonant transverse vibration the stretched grid wires.

As the periodicity of the variable magnetizing forces of the nickel rod is slowly increased, wires of the grid will break into transverse vibration as the imposed oscillations coincide with the natural transverse vibration frequency of the wires. The nickel rod changes length twice with each cycle of the driving current, hence the frequency imposed on the grid wires will be twice as great as the frequency of the variable oscillator.

Referring again to Fig. 3 it appears that a tungsten wire of 1.71" length stretched to a tension force of 5 units or one-half of the rupturing force of 10 units, will vibrate transversely at a frequency of 10,000 cycles per second. If such a filament is improperly tensioned or poorly brazed to the frame it will not vibrate at 10,000 cycles imposed oscillations.

If the grid wires are observed through a microscope, the objective of which is indicated at 22, or other means giving an optical magnification of at least 20 fold, and the frequency of imposed longitudinal oscillations is swept through an appropriate range, perfect grids will exhibit reproducible and uniform transverse vibratory response. The longest center wires will resonate at the lowest frequency. As the frequency is increased the adjacent shorter wires will resonate and so on until the outer wires are reached. Deviations from this pattern may be caused by defects, such as loose wires. Consequently, faulty grids may be detected.

The driving voltage for the transducer should be a sine wave of low distortion. Excessive harmonics in the driving current may cause spurious vibrations to be set up in the grid wires which will mask the results. Assuming for purpose of illustration grid wires having a diameter of 0.0003" and a span of 0.171" for the longest wire of the grid, the electric oscillations during test may be swept, that is, progressively varied, through a range of about 5,000 to 10,000 cycles, corresponding to longitudinal mechanical vibrations in a range of 10,000 to 20,000 vibrations per second at the transducer head holding the grid.

What I claim as new and desire to secure by Letters Patent of the United States is:

1. An apparatus for inspecting a structure comprising a frame having a plurality of filaments of different length mounted thereon under tension said apparatus comprising the combination of an electromechanical transducer, means for mounting said frame on a longitudinally vibrating element of said transducer with said filaments oriented at substantially right angles to the direction of longitudinal vibration of said element and so that the filaments may vibrate in the plane in which the filaments lie, whereby said frame may be subjected to mechanical vibration at right angles to the length of said filaments, means for energizing said transducer to vibrate longitudinally over a frequency range in which properly mounted filaments will vibrate transversely and means for obtaining a magnified image of said filaments while said frame is being vibrated whereby any departure from a predetermined standard of filament condition may be determined by visual inspection.

2. A testing apparatus comprising the combination of an elongated vibratory member, one end of which is fixed, the opposite end being free to vibrate longitudinally, means for generating a variable magnetic field which is oriented to subject said member to vibration by magnetostriction, means for controlling at will the frequency of variation of said field and means for mounting upon a free end of said member a specimen comprising a planar array of one or more filaments to be tested so that said filaments will vibrate in the plane of said array and means for obtaining a magnified image of said specimen to determine the vibratory response of said filaments to vibrations of said member.

References Cited in the file of this patent

UNITED STATES PATENTS

| | | |
|---|---|---|
| 1,516,947 | Beindorf | Nov. 25, 1924 |
| 2,105,479 | Hayes | Jan. 18, 1938 |
| 2,278,241 | Case | Mar. 31, 1942 |
| 2,278,510 | Condon | Apr. 7, 1942 |
| 2,306,137 | Pabst et al. | Dec. 22, 1942 |
| 2,554,212 | Quinlan | May 22, 1951 |
| 2,667,068 | Viehe | Jan. 26, 1954 |

FOREIGN PATENTS

| | | |
|---|---|---|
| 163,048 | Switzerland | Oct. 16, 1933 |